UNITED STATES PATENT OFFICE.

PAUL SAVÉS, OF TOULOUSE, FRANCE.

PROCESS OF GRANULATING CALCIUM CYANAMID.

1,399,660.   Specification of Letters Patent.   Patented Dec. 6, 1921.

No Drawing.   Application filed November 22, 1919. Serial No. 340,079.

*To all whom it may concern:*

Be it known that I, PAUL SAVÉS, citizen of the French Republic, residing at Toulouse, Haute-Garonne, France, have invented certain new and useful Improvements in Processes of Granulating Calcium Cyanamid, of which the following is a specification.

This invention relates to a new process of granulating calcium cyanamid and has for its object to further the use of calcium cyanamid as an ammonia-potassic fertilizer.

The new process consists in treating calcium cyanamid by means of water to which potassium silicate has been added.

This operation is effected at the time of extinguishing the cyanamid by means of a hydrator. The resulting paste is then conducted into a kneading machine and passes finally into a hot-air drier similar to that used for desiccating superphosphates. The treatment is finished by a suitable crushing.

Potassium silicate has very prominent agglutinating properties and is moreover soluble in water. Exposed to the air, it transforms gradually into potassium carbonate.

In his treatise of chemistry, Ostwald states, alkaline silicates are decomposed in the soil and pass to the state of carbonates. At low temperature carbon dioxid expels silicon dioxid or acid from its combinations. As a consequence thereof the system carbonate and silicon dioxid or acid is more stable than the inverse: carbon dioxid and silicate.

This matter of fact has been corroborated also by Kuhlmann who has demonstrated that a silicate solution exposed to air attracts carbon dioxid and converts gradually into a jelly of silica, when there is simultaneous formation of alkaline carbonate. In his mind, this is how silicates transform to silica $(SiO_2)$ Artificial potassium silicate of trade, applied to granulating cyanamid, contains in addition an excess of potash which turns immediately to potassium carbonate.

Let us now consider the reactions which occur in the soil with cyanamid granulated by means of silicate. Air and water give first:

$$SiO_3K_2 + CO_2 + H_2O = CO_3K_2 + SiO_3H_2$$

Then cyanamid decomposes according to the formula

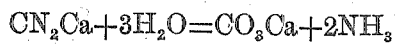

Part of the transformed silica is dissolved and carried away by water. The other part combines with certain soil constituents. Such is the formation of hydrated magnesium silicate.

The so formed potassium carbonate is very soluble in water. It is directly assimilated by plants and constitutes therefore a first class potassic fertilizer.

Thus, the products resulting from the decompositions of potassium silicate and cyanamid are as follows: ammonia, potassium carbonate, calcium carbonate and silica.

Granulation of calcium cyanamid by means of potassium silicate may be done in two different ways, according to the result aimed at, namely:

1° simple granulation;

2° high dose granulation permitting of utilizing the product formed as an ammonia-potassic fertilizer.

The complete scarcity of potassium silicate during the war has obliged the inventor to use a product of a quasi abnormal composition containing little potash.

Let us now consider the results secured by these various experiments.

*Simple granulation.*—The utilized silicate of potassium was of 32.5 Bé. at 19° centigrade. The following mixture has been made:

Silicate of potassium __ 130 grams.
Water _____ 40 gr.

titrating 32.5 Bé. at 19° C. Then the following proportions were taken:

Cyanamid _____ 45 gr.
Silicate of potassium at 32.5 Bé. _____ 55 gr.

The weight of this mixture is 100 gr. in the wet state. After having been dried, it yields a weight of 60 gr. granulated cyanamid.

According to this process, a raw cyanamid containing 15% initial nitrogen gives granules of the following contents:

Nitrogen _____ 12.10%
$K_2O$ soluble in water _____ 1.62%

This cyanamid having been treated mechanically appears in the form of small grains of a gray tint which do not soil nor burn the hands of the manipulator. Its odor has completely disappeared.

This material is nondusty so that manual spreading is easily effected.

The treatment it has been submitted to, permits of purifying the material and obtaining a product which resists the action of air but decomposes easily within the soil.

*High dose granulation.*—Now we pass to the second case, *i. e.*, obtaining a granulated cyanamid which may be considered as an ammonia-potassic fertilizer, suitable for the composition of a complete fertilizer.

To accomplish this mode of granulation, the following mixture is made:

100 gr. of raw cyanamid containing 15.40% of nitrogen.

200 gr. of potassium silicate of 32.5 Bé. at 19° C., which makes together 300 gr. of materials. After having dried the paste, water having been eliminated, the total weight is reduced to only 185 gr. Thus a loss occurred amounting to:

$$300-185=115 \text{ gr.}$$

*i. e.* 38.33%.

The resulting product is a mixture of cyanamid and potassium silicate.

The analysis of this cyanamid, made eight days after preparation, has given the following results:

Nitrogen _____ 8.27%
$K_2O$ soluble in water_____ 4.47% which makes together 12.74% available to the plants. The slight difference observed in comparison with the primitive cyanamid and which amounts to:

$$15.40 - 12.74 = 2.66\%$$

is only due to contribution of silica from the silicate and impurities which dilute the nitrogen in a greater quantity of material. Consequently this nitrogen is not lost.

The product resulting from said treatment has to a higher degree the same physical properties that are obtained from the preceding one. Moreover, it contains a higher amount of potash.

Obviously, the results obtained by the above stated experiments may be largely surpassed by making use of a normal potassium silicate. It will be sufficient to previously know the composition of the silicate utilized, in order to bring it back to the degree of fluidity and the potash contents desired. The hardness of cyanamid granules depends exclusively on the viscosity of the silicated solution.

Sodium silicate can satisfy the same physical conditions as potassium silicate. However, using the latter will be preferred owing to its contributing potash which is a useful constituent for the soil. From this point of view, soda has a considerably less value.

The present process has the great advantage of its eliminating at the same time the impurities of the cyanamid, such as calcium phosphid and calcium carbid which are real poisons to the plants, and to give simultaneously a product embodying to the soil an element of great value, *i. e.*, potash.

Granulating with potassium silicate moreover permits of attenuating the nitrogen losses occurring in the form of ammonia when raw cyanamid is exposed to the air. This fact has been ascertained by the following comparative experiment:

A layer of 1 centimeter thickness of raw cyanamid containing 15.40% of nitrogen and a layer of granulated cyanamid (nitrogen = 8.27%), all conditions being equal, have been left to the air for one month's duration.

After said time, the raw cyanamid becomes grumous, whereas the appearance of the granulated cyanamid has undergone no change at all.

Nitrogen contents have become as follows:

As to raw cyanamid: 13.78%, *i. e.*, a loss of $15.40 - 13.78 = 1.62\%$ of nitrogen.

As to granulated cyanamid: 8.12%, the nitrogen loss amounting thus to $8.27 - 8.12 = 0.15\%$.

This shows the advantage secured by granulation.

The present process is the more practical as potassium silicate is, in normal times, a cheap material which is produced on a large scale. Moreover, its transformation into potassium carbonate occurring slowly, its mixture with cyanamid is all the more useful as the latter is classed under the slowly acting fertilizers, wherefrom it appears that their actions will show themselves at the same time.

The thus obtained granulated cyanamid may constitute the basis of a complete fertilizer; the only constituent failing is phosphoric acid. It will be sufficient to incorporate corresponding amounts of bone-ashes titrating 28 to 29% of $P_2O_5$ or dephosphoration slags containing 18% of $P_2O_5$ in the form of phosphate of lime and alumina.

Adding superphosphates is to be avoided as they would undergo the phenomenon of retrogradation owing to excess of lime.

This fertilizer would include the four constituents which are indispensable to agriculture, *i. e.*: nitrogen, potash, phosphoric acid and calcium carbonate, the latter being absolutely necessary to nitrification and to assimilation of potash.

The process of granulation disclosed in the present specification may be applied by means of all silicates, such as those of sodium, calcium, magnesium, aluminium and (or) manganese.

I claim:

1. The process of granulating calcium cyanamid, consisting in treating calcium cyanamid with a silicate solution, and crushing.

2. The process of granulating calcium cyanamid, consisting in treating calcium cyanamid with a solution of a silicate in water, and crushing.

3. The process of granulating calcium cyanamid, consisting in treating calcium cyanamid with a solution of potassium silicate, and crushing.

4. The process of granulating calcium cyanamid, consisting in treating calcium cyanamid with a potassium silicate solution at the time of extinguishing the cyanamid, submitting the resulting mass to a kneading machine, drying the resulting mixture and crushing the desiccated material to granulated form.

In testimony whereof, I affix my signature in the presence of two witnesses.

PAUL SAVÉS.

Witnesses:
 JAMES D. CHILDS,
 A. N. RANDALL.